Figure 1:
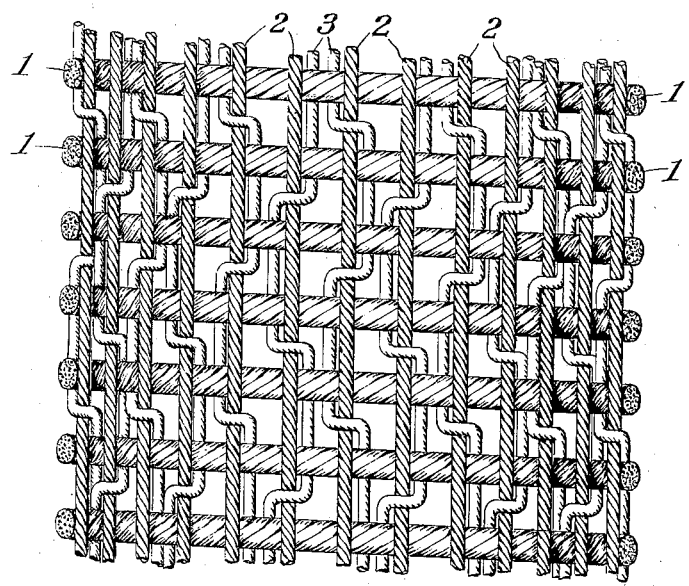

M. R. RHOMOSER.
CIRCULAR LOOM.
APPLICATION FILED FEB. 2, 1914.

1,139,073.

Patented May 11, 1915.
10 SHEETS—SHEET 1.

Witnesses:
Edw. W. Vaile.
D. B. Vanderbilt.

Matthew R Rhomoser, Inventor
By his Attorney
Ernest Hopkinson

M. R. RHOMOSER.
CIRCULAR LOOM.
APPLICATION FILED FEB. 2, 1914.
1,139,073.
Patented May 11, 1915.
10 SHEETS—SHEET 2.
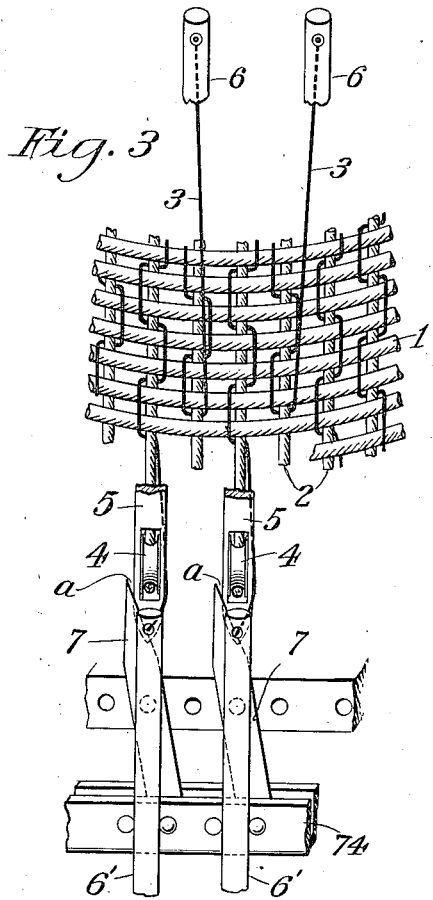
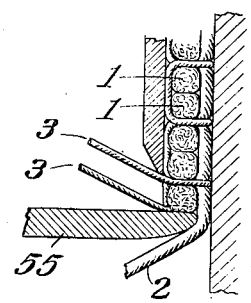
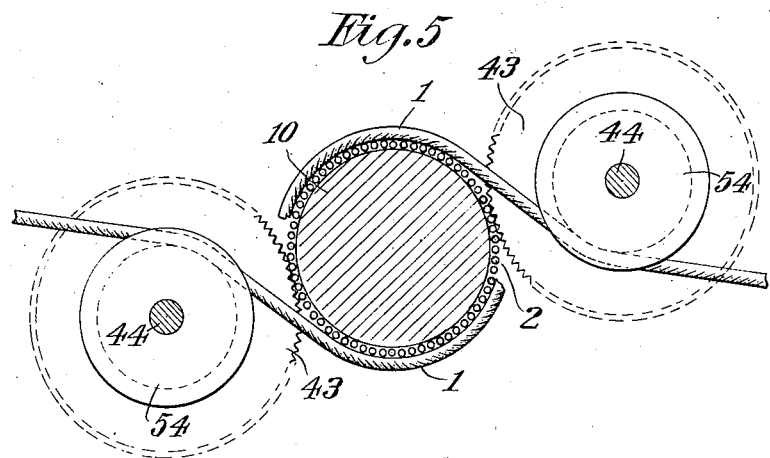
Witnesses:
Edw. W. Vaill
D. B. Vanderbilt
Matthew R. Rhomoser, Inventor
By his Attorney
Ernst Hopkinson

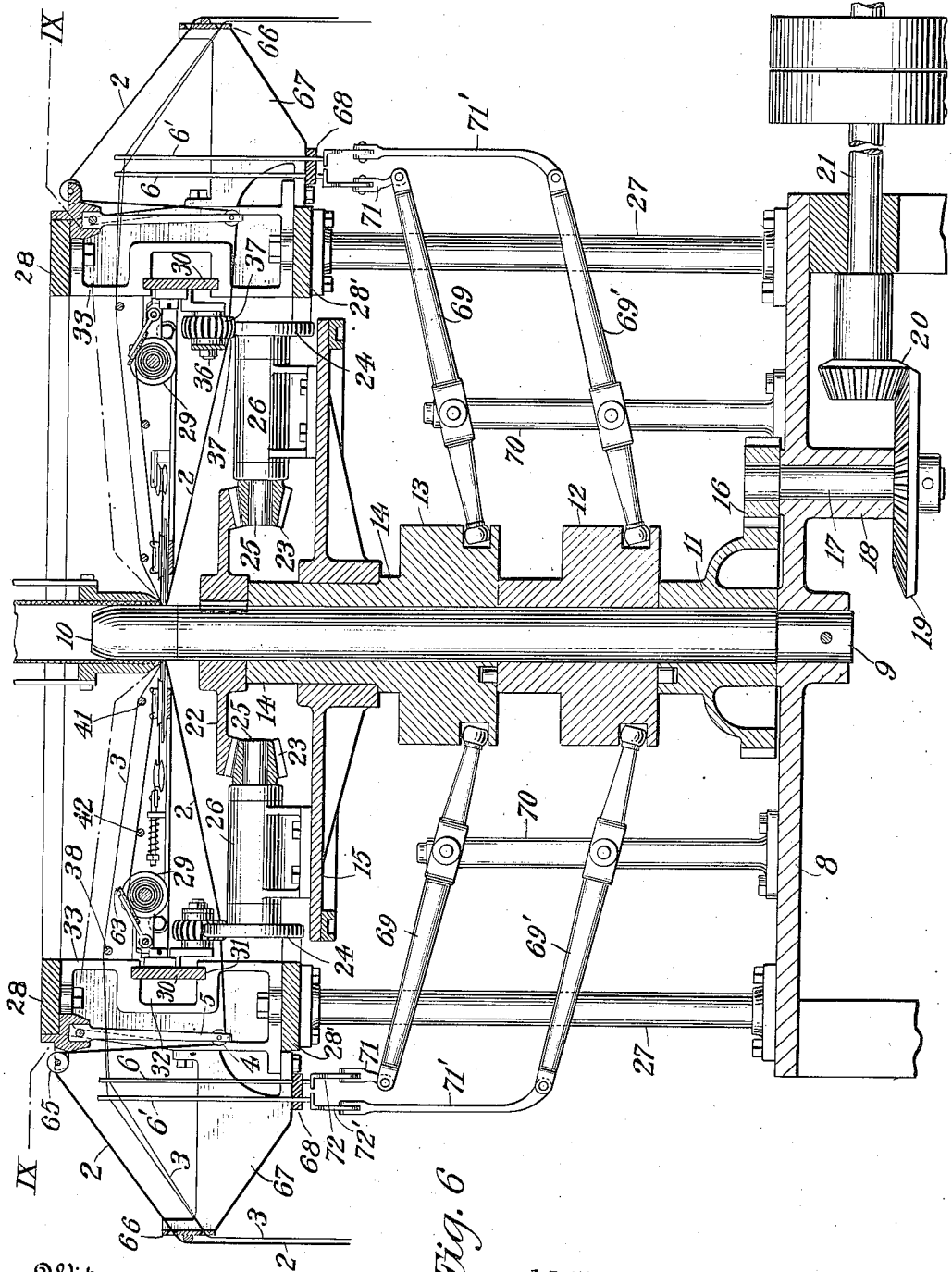

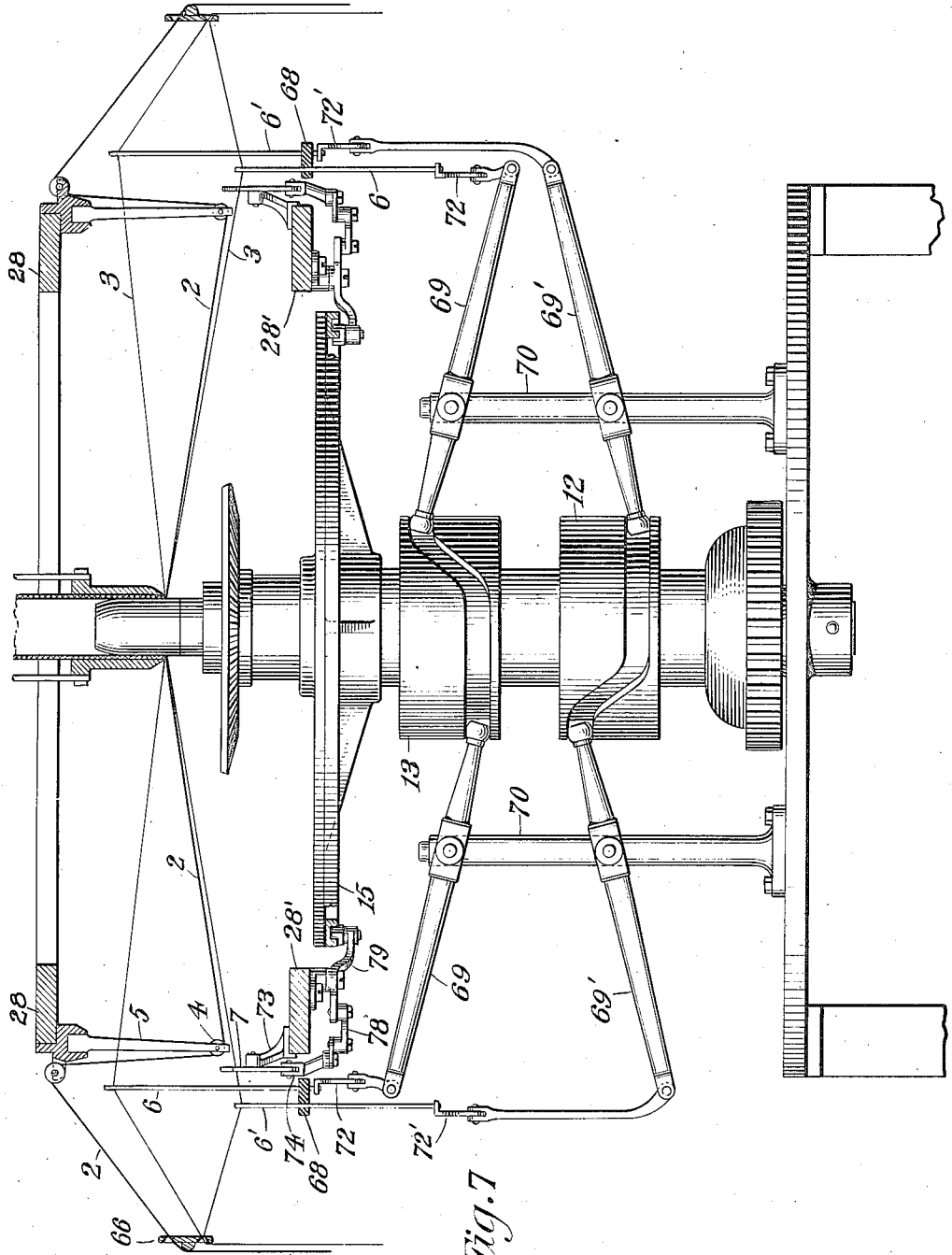

M. R. RHOMOSER.
CIRCULAR LOOM.
APPLICATION FILED FEB. 2, 1914.
1,139,073.
Patented May 11, 1915.
10 SHEETS—SHEET 5.
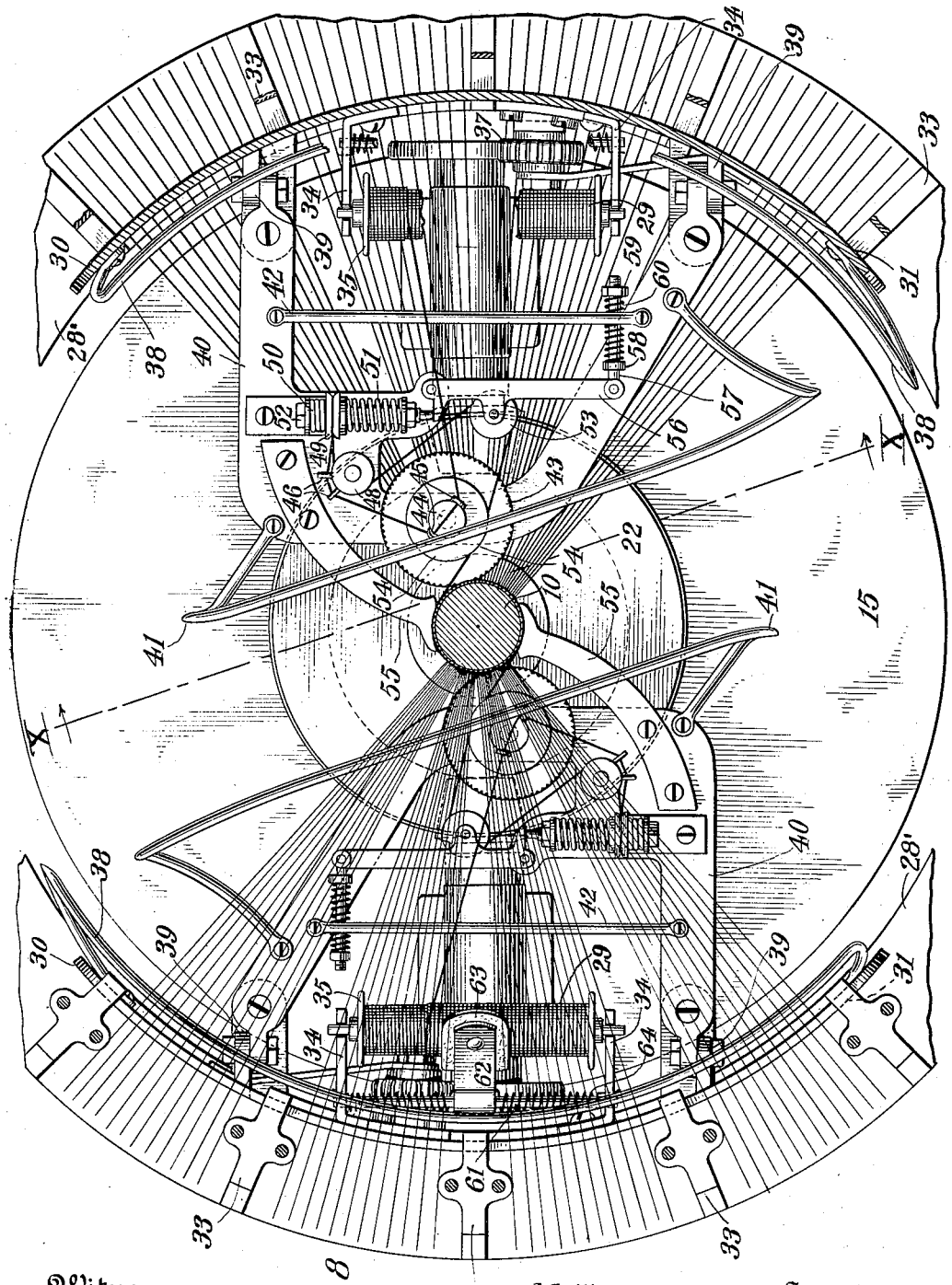

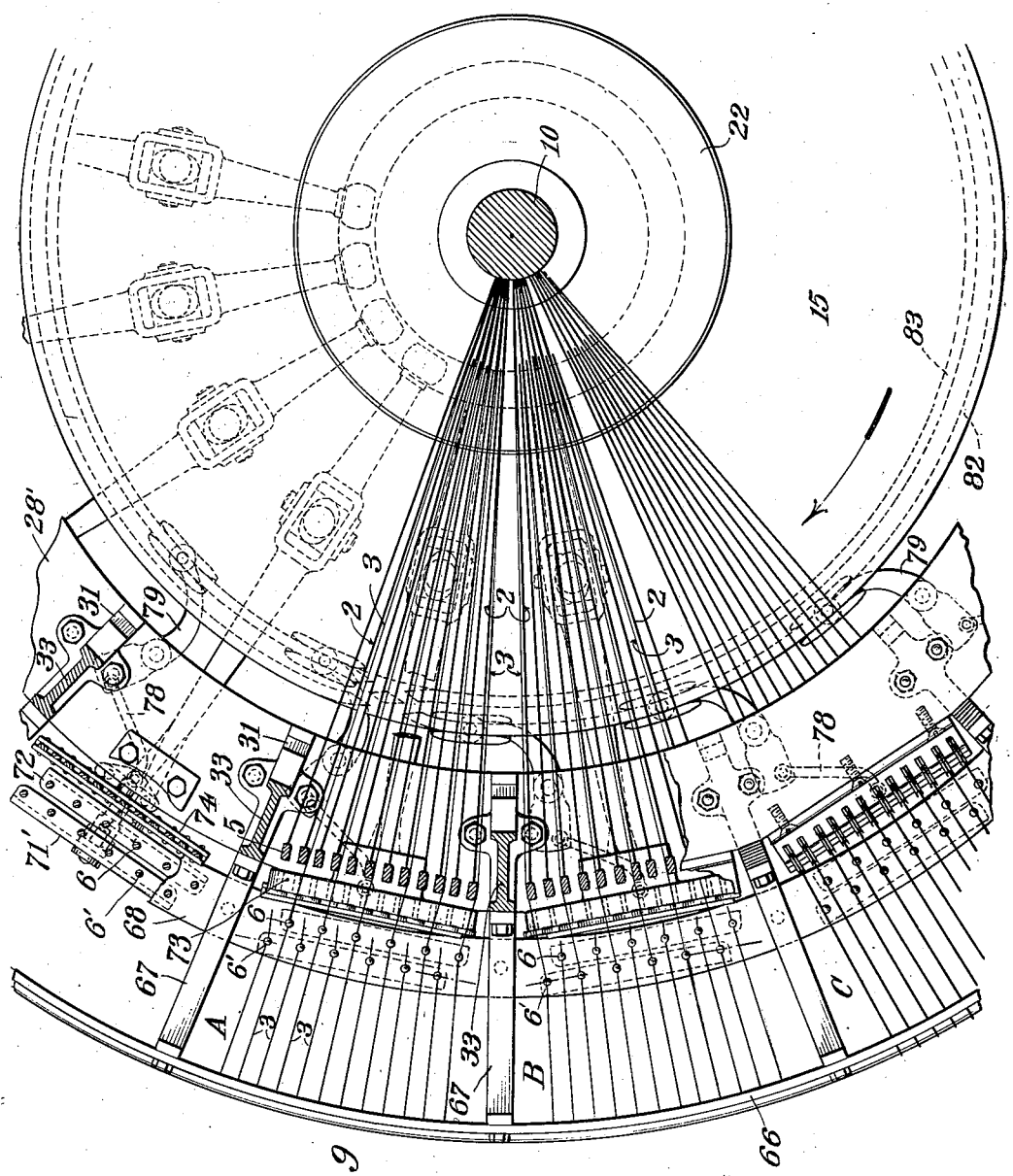

M. R. RHOMOSER.
CIRCULAR LOOM.
APPLICATION FILED FEB. 2, 1914.
1,139,073.
Patented May 11, 1915.
10 SHEETS—SHEET 7.
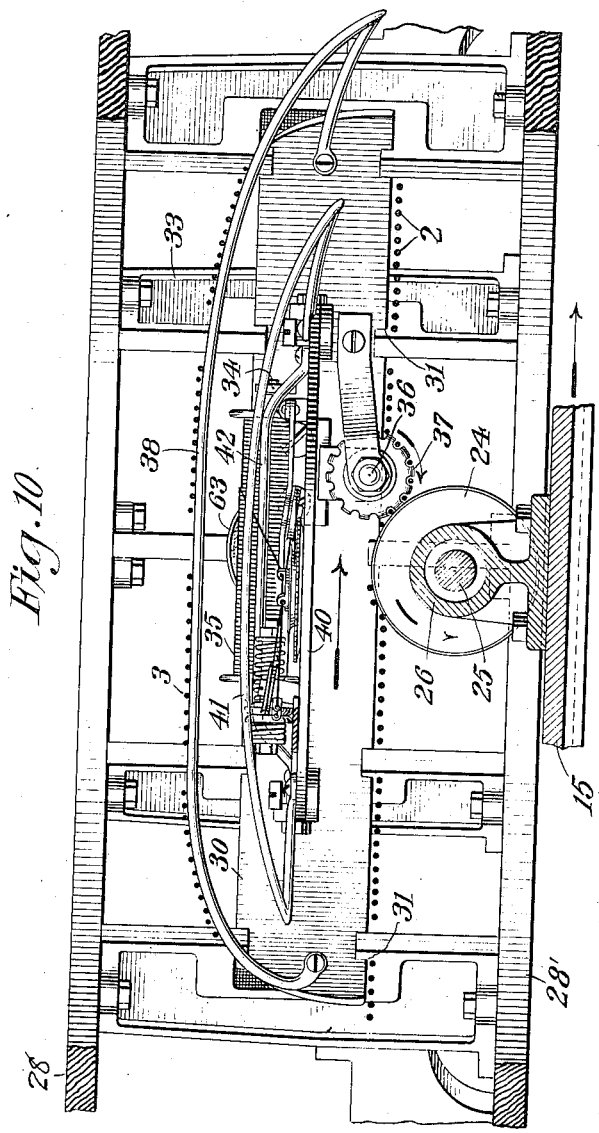
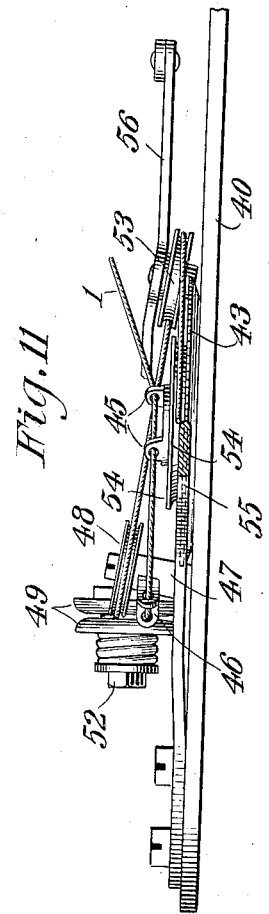
Witnesses:
Edw. W. Vaile
J. B. Vanderbilt
Matthew R. Rhomoser, Inventor
By his Attorney
Ernest Hopkinson

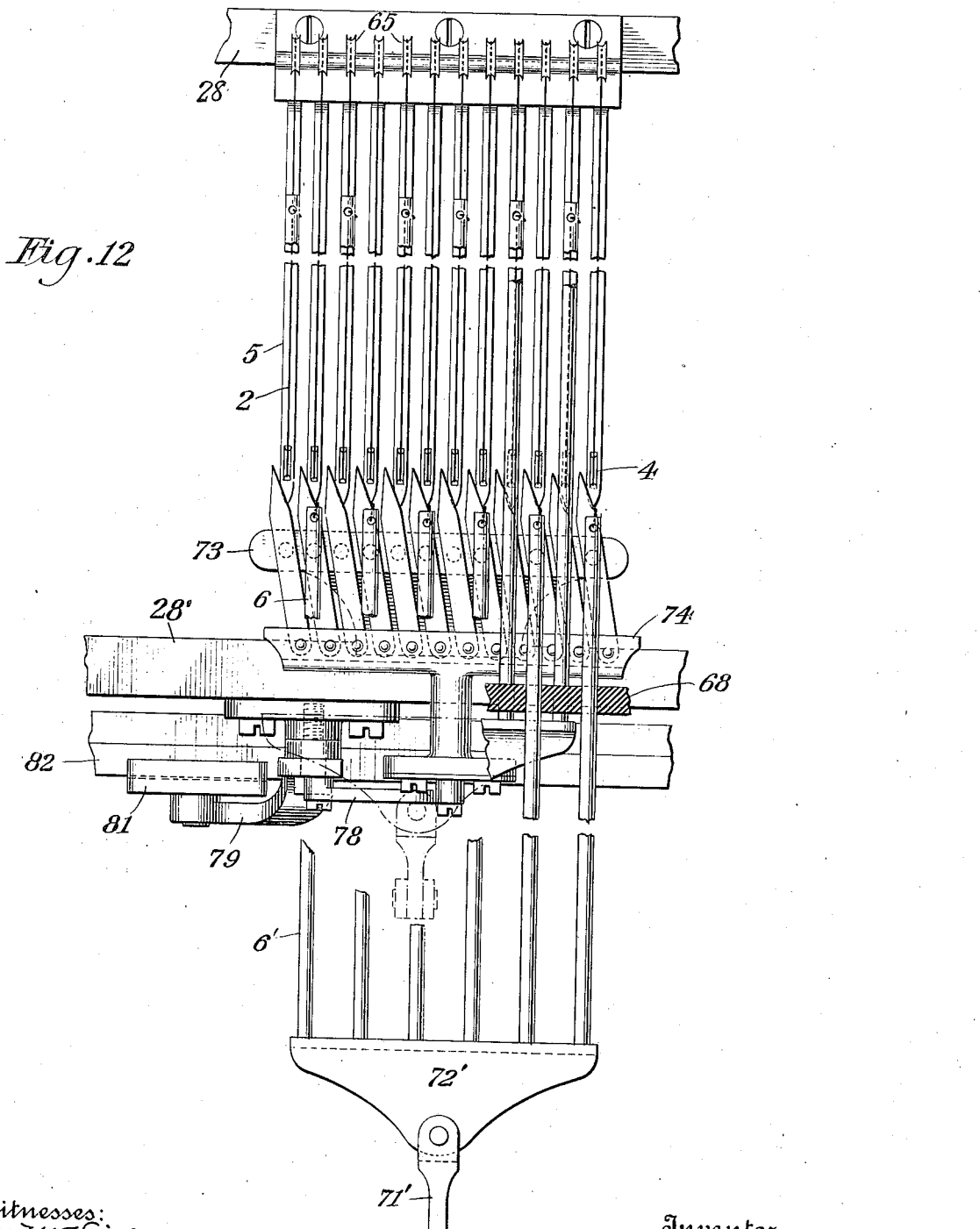

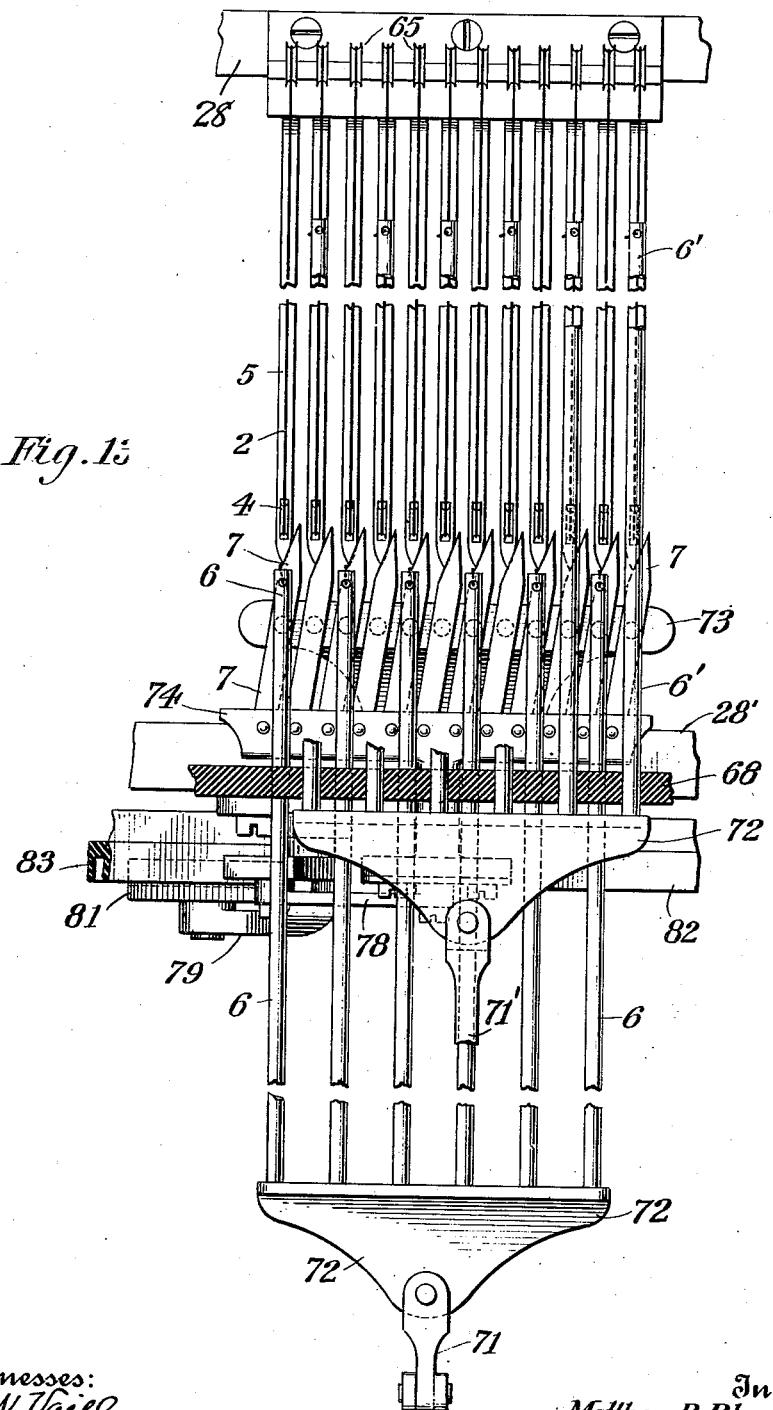

M. R. RHOMOSER.
CIRCULAR LOOM.
APPLICATION FILED FEB. 2, 1914.
1,139,073.
Patented May 11, 1915.
10 SHEETS—SHEET 10.
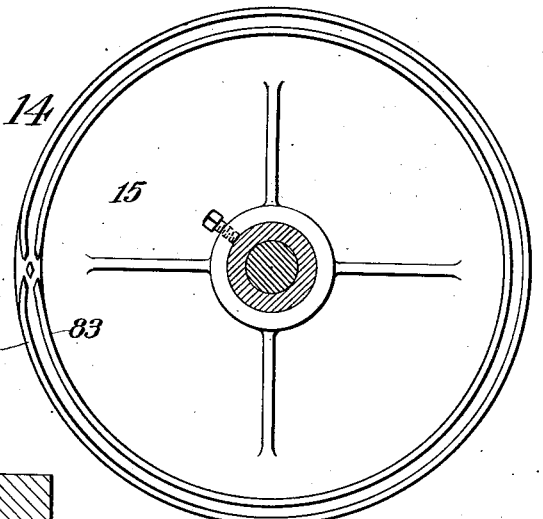
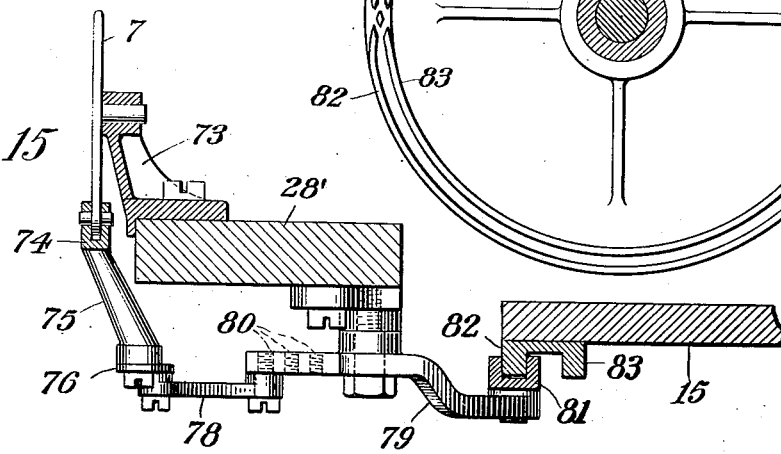
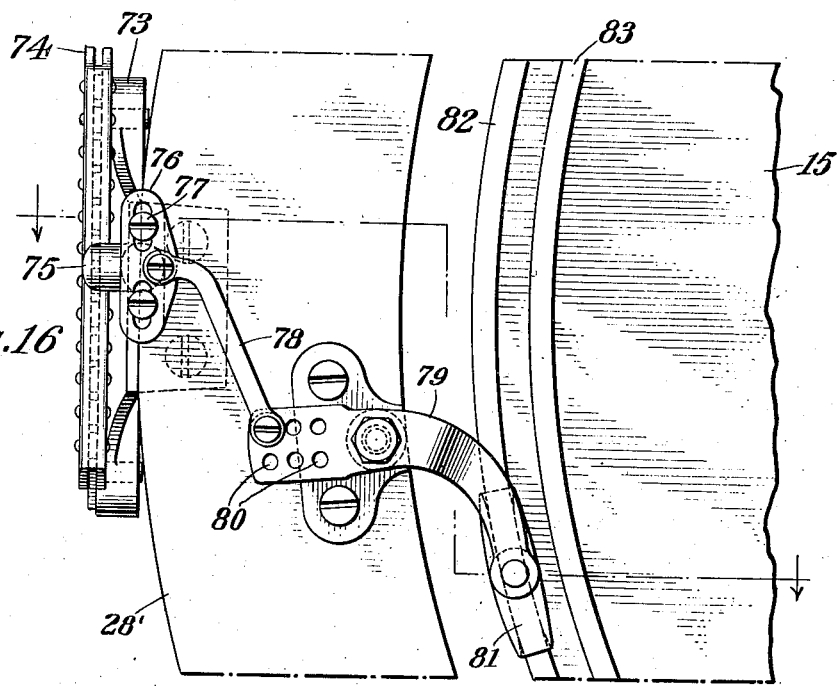

UNITED STATES PATENT OFFICE.

MATTHEW R. RHOMOSER, OF SANDY HOOK, CONNECTICUT, ASSIGNOR TO FABRIC FIRE HOSE COMPANY, OF NEW YORK, N. Y., A CORPORATION OF NEW YORK.

CIRCULAR LOOM.

1,139,073.  Specification of Letters Patent.  Patented May 11, 1915.

Application filed February 2, 1914. Serial No. 815,937.

*To all whom it may concern:*

Be it known that I, MATTHEW R. RHOMOSER, a citizen of the United States, residing at Sandy Hook, county of Fairfield, and State of Connecticut, have invented certain new and useful Improvements in Circular Looms, of which the following is a full, clear, and exact disclosure.

My invention relates to circular looms and particularly to that class of looms for weaving tubular fabrics for cases or jackets of fire and other hose.

The object of my invention is to produce a circular loom which will weave a tubular fabric of the nature described in the application of William T. Cole, No. 785,847, filed August 21, 1913, for hose fabrics.

The principal characteristic of this fabric is that the weft or filler strands of the hose are wound or placed helically about the straight warp strands which are always maintained on the inner side of the weft strands. The weft or filler strands and the warp strands are united by means of an auxiliary strand which has only the function of a binder, although in weaving the fabric the binder strands are treated in a manner similar to auxiliary warp strands. This manner of weaving the fabric produces a tubular case or jacket which when used in connection with hose allows very little longitudinal stretch under pressure of the fluid within the hose and also prevents twisting of the hose under pressure. This arises by reason of the fact that the main warp strands are substantially straight while the weft strands are substantially smooth helices or arcs of circles and are always located on the same side of the respective strands, not being sinuously woven in and out between each other as in the case of hose of ordinary interlocking weave.

Figure 2:
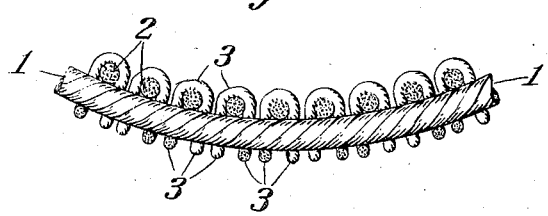

For a detailed description of one form of my invention which I at present deem preferable, reference may be had to the following specification and to the accompanying drawings forming a part thereof in which:

Figure 1 is a diagrammatic view of a section of a tubular fabric cut on a longitudinal diametric plane and showing the inside surface thereof so as to illustrate the arrangement of the yarn in weaving, the strands of the yarn being enlarged and separated to show the relative arrangement more clearly.
Fig. 2 is a transverse diagrammatic sectional view of the same section of the fabric as illustrated in Fig. 1. Fig. 3 is a diagrammatic view illustrating the manner in which the binder strands are looped about the warp strands and the filler strands. Fig. 4 is a sectional view of a portion of the fabric being woven and indicating the manner in which the beater or packer forces the yarn into position between the passages of the rotary shuttle. Fig. 5 is a plan view illustrating the manner in which the weft or filler strands are wound about the warp strands and indicating the action of the spacer disks. Fig. 6 is a vertical sectional view through the axis of the machine, showing the relation of the rotary shuttles to the warp strands and the heddles for looping the binder strands about the warp strands. Fig. 7 is a side elevation of the machine, the outer portions thereof, however, being shown in section to indicate the parts for operating the heddles and those for controlling the motion of the binder strands. Fig. 8 is a plan view of the machine showing the action of the shuttles, the forming head being shown in cross section, the means for holding and operating the binder and warp strands being omitted. Fig. 9 is a horizontal sectional view of the machine, taken substantially on the line IX—IX of Fig. 6, the shuttle mechanism being omitted for clearness. Fig. 10 is a vertical sectional view taken substantially on the line X—X, Fig. 8. Fig. 11 is an enlarged view of the shuttle in elevation, showing the manner in which the weft or filler strands are given the requisite tension. Fig. 12 is an elevation, partly in section, looking toward the center of the machine, showing the parts for controlling the motion of the binder strands when the same are being looped about the warp strands. Fig. 13 is a view similar to that of Fig. 12, but showing the shifting devices for the binder strands in another position whereby the binder strands are looped about the warp strands in the opposite direction. Fig. 14 is a plan view of the cam track for controlling the shift of the devices which guide the binder strands about the warp strands. Fig. 15 is a sectional view of one of the guide devices or switches, illustrating how it is connected with the cam track. Fig. 16 is a plan view of the same, showing, however, a series of switches which are operated by one movement of the cam follower.

By referring to Fig. 1, it will be seen that the weft or filler strands which give the circumferential strength and body to the hose or tubular fabric are wound spirally about the inner straight warp strands 2. These two sets of strands are bound together by means of the binder strands 3 which pass successively over the warp and filler strands in any suitable way, but preferably in the manner indicated in Fig. 1, that is, the binder strand is looped over the warp strand between two strands or picks of the filler, then passes over two of the filler strands and again between two picks of the filler in the opposite direction, this being repeated during the entire length of the warp strands, and the adjacent warp strands having the loops of the binder strands arranged alternately with those about the other warp strands.

The main principle of the operation of the machine is most clearly illustrated in Fig. 3 in which it will be seen that the warp strands 2 pass around a small wheel 4 at the lower end of the downwardly projecting supporting rods 5. From this wheel the warp strands pass upward, as indicated in Fig. 6. The binder strands 3 are threaded through the ends of vertical reciprocating heddles 6, there being two sets of heddles for each radial segment of the machine, which operate alternately to produce the alternate loopings of the binder strands about the warp strands. In Fig. 3 two of these heddles are shown in the raised position and two in the lowest position, the upper ones being indicated by the numeral 6 and the lower ones by the numeral 6'. The looping action of the binder strands about the warp strands is produced by shifting the binder strands around the lower ends of the vertical rods 5 which contain the warp strands. In Fig. 3 the binder strands which pass through the heddles 6' have just passed said ends of the vertical rods and are starting on their upward movement, the loop having just been made.

The switches or guides 7 are what produce the requisite motion to the binder strands about the warp strands passing through the ends of the rods 5. In Fig. 3 it will be seen that these switches are indicated as inclined toward the left. The downward motion of the heddles carrying the binder strands has caused the binder strands to pass between the switches 7 and the rods 5 at the point indicated by the letter $a$. By a further motion, the binder strand is slightly deflected until the end of the rod 5 is reached, at which point the tension of the strand causes it to spring around the end of the support toward the right, it being unrestrained in that direction, and the next upward motion of the strand causes the same to pass along the right hand side of the support 5. The heddle then continues its upward motion until the position 6 is reached at which point the shuttle carrying the filler strand passes between the binder strands and the warp strands. This is immediately followed by the beater, as indicated in Fig. 4. This comprises the essential operation of the machine, the details of which will now be described.

The machine as a whole is of the general type of that shown in the patent to Stowe, No. 446,085, dated Feb. 10, 1891, the shuttle, however, being driven by a pushing wheel similar to that illustrated in the patent to De Laski, 502,231, dated July 25, 1893.

Referring to Fig. 6, the numeral 8 indicates a base upon which the main parts of the machine are mounted. At the center of this is a vertical stationary spindle 9 upon the upper end of which is placed the forming head 10. Adjacent the lower end of the spindle 9 a gear 11 is rotatively mounted and this is pinned or otherwise keyed to the two cams 12 and 13, the upper one of which carries a sleeve 14 to which is fixed a disk 15 carrying the shuttle driving mechanism. The gear 11 meshes with the pinion 16 fixed to the upper end of a shaft 17 in the bearing 18 projecting downward from the base 8. The lower end of the shaft 17 carries a beveled gear 19 which meshes with a corresponding beveled pinion 20 fixed to the main driving shaft 21. The gear 22 fixed to the spindle 9 adjacent the upper end meshes with a corresponding beveled pinion 23 which drives the push wheel 24 by means of a shaft 25 carried in the bearing 26 mounted on the carrier 15. The posts 27 support the circular frame 28 on which are mounted the shuttles 29 and the guides for the heddles 6 and 6', as well as the other parts for directing the warp threads 2 to the proper weaving position about the forming head 10.

Referring to Figs. 6, 8, 10 and 11, it will be seen that the shuttles comprise first, an annular segmental support 30 which is guided in the frame 28 by having its edges working in grooves 31 formed on the inner horizontal sides of the recesses 32. These recesses are formed in the vertical radial platens 33, so that the shuttle support 30 is always carried by at least 4 of the platens. Fixed to the segmental support 30 are two vertical arms 34 whose upper ends form bearings for the spool or bobbin 35 on which the weft or filler strands are wound (Fig. 8). Also projecting from the segmental support 30 is stud 36 upon which is rotatably mounted a toothed wheel 37. The notches in this wheel 37 are for the purpose of allowing the warp strands to pass between the driving wheel 24 and the toothed wheel 37 without abrasion from being pinched between the two wheels.

By referring to Fig. 10 it will be seen that as the toothed wheel 37 advances under pressure of the wheel 24, the warp strands 2 are deflected downward by being caught in the notches of the wheel 37 and as the wheel passes are then forced slightly upward over the highest point of the driving wheel 24 until they are again allowed to assume their normal position under the tension of the strands.

Also attached to the segmental shuttle support 30 is a bowed wire dividing member 38 which raises the binder strands 3 a sufficient distance to allow the parts of the shuttle to pass beneath without contacting therewith. Upon two carriers 39 fixed to the shuttle support 30 are pivotally mounted two ends of an approximately U-shaped frame 40 which forms a support for the weft tension devices, the binder spacing device and the beater or packer. Upon this frame 40 is also supported another bow separator 41 which serves in addition to the separator 38 to enable the parts of the shuttle to pass beneath binder strands 3. This is also aided by a third separating bar 42 which is located parallel and adjacent to the spool 35. The spacer 43 is rotatably mounted upon a stud 44 carried by the frame 40. The upper end of this stud carries two eyes 45 through which the filler strand 1 passes directly from the spool or bobbin 35. The filler strand then passes through two eyes 46 carried on the base of a stud 47 (Fig. 11) on which is mounted a grooved wheel 48. The strand then passes between two disks 49 which are forced toward each other by means of the springs 50 and 51 mounted on the horizontal bolt 52, the nut of which may be turned to adjust the pressure between the disks 50 and 51. The filler strand then passes once around the grooved wheel 48, the grooved wheel 53, and a grooved disk 54 fixed to the spacer 43; thence it passes to the weaving point and is forced home by the packer or spacer 55 which consists of an arm screwed to the frame 40, as indicated. The grooved wheel 53 is mounted on the lever 56, the inner end of which is pivoted to a projection on the frame 40, and the outer end of which is pivotally connected with the screw-threaded bar 57 which passes through the lug 58 on the frame 40. Between the nut 59 and the lug 58 is a compression spring 60 which gives the requisite pull according to the tension obtained by the friction disks 49. Between the arms 34 and passing through holes therein is a rod 61 upon the middle of which is mounted an arm 62 having a friction pad 63 attached to its outer end. This bears upon the filler strand on the spool or bobbin 35 to give the requisite friction and prevents the strand from unwinding too rapidly, the requisite pressure being provided by a coiled spring 64 on the rod 61. This completes the bobbin and its attached parts. There being two of these bobbins, two filler strands are always wound side by side about the warp strands at the weaving point. These bobbins are kept in correct relative position by the push or driving wheels 24 mounted on the carrier 15, the latter being rotated at approximately the same circumferential speed that the bobbins advance, by means of the gears 22 and 23 (Fig. 6).

As above referred to, the warp strands 3 pass small grooved wheels 4 (Fig. 6) mounted on the lower ends of the supporting rods 5 having previously passed over the grooved wheels 65 mounted upon the upper corner of the frame 28 to which they are delivered from a supporting ring 66 carried on the bracket 67 attached to the frame 28. The binder strands 3 also pass through the ring 66 and thence to the heddles 6 and 6' which reciprocate through holes in the horizontal ring 68 attached to the lower edges of the bracket 67. This reciprocating motion is produced by means of the levers 69 and 69' fulcrumed on the supports 70. The inner ends of the levers 69 and 69' engage cam tracks or grooves in the horizontal cams 12 and 13, respectively. The outer ends of the levers 69 and 69' are connected with the heddles through the connecting bars 71 and 71', as indicated more clearly in Figs. 12 and 13, there being six heddles attached to each yoke, this being the largest number of heddles that can be operated simultaneously, owing to the limitation of space allowed for the levers 69 and 69' about the circumference of the cams 13 and 12, as indicated in dotted lines in Fig. 9.

As above pointed out, the binder strands are caused to be carried about the warp strands between each passage of a shuttle through the combined reciprocating motion of the heddles and the action of the switches referred to. This action will be clearly seen by referring to Figs. 7, 9, 12 and 13.

In Fig. 7 it will be seen that the switches 7 are mounted on brackets 73 carried on the lower supporting ring 28' of the frame 28 and between the platens 33. One switch is located opposite the lower end of each warp strand support 5 and there being twelve of these corresponding to the two sets of heddles 6 and 6' carried on the yokes 72 and 72' comprised in one segmental section of the machine between two platens, there must be therefore twelve stitches. This will be most clearly appreciated by referring to Fig. 9. Each set of switches is pivoted to a grooved yoke 74 (Figs. 3 and 15) fixed on the upper end of an arm 75 attached to a plate 76 (Fig. 16) by means of the screw and slot connection 77. A connecting bar 78 is pivoted to the plate 76, the latter also being pivoted to the lever 79 fulcrumed on the supporting ring 28'. This lever is provided with a series of holes adjacent one end, indicated by the numeral 80, to allow adjusting of the angle of inclination of the switches 7 in conjunction with the screw and slot connection in the plate 76. The inner end of the lever 79 is provided with a grooved cam follower 81, the groove of which is adapted to receive the ribs 82 and 83 of a double cam track mounted on the lower side of the carrier 15 for the shuttle driving mechanism. This cam track is provided with a cross-over at one point so that the follower 81 is caused to assume an outer position with reference to the radius of the machine during one complete revolution and an inner position during the next revolution and so on alternately. Thus it will be seen that through the connection of the follower 81 with the switches, the latter will be caused to be inclined in one direction during one complete revolution of the shuttle driving mechanism and during the passage of the two shuttles and inclined in the opposite direction during the next revolution of the shuttle driving mechanism and the succeeding passages of the two shuttles.

It should be noted that during the passage of the shuttles between the warp strands 2 and the binder strands 3, both sets of the binder strands are in the raised position and the looping action of the binder strands about the warp strands takes place at an angle of 90 degrees to the position of the shuttles. This will be made evident by comparing Fig. 8 with Fig. 9 and Fig. 6 with Fig. 7.

Referring particularly to Fig. 9 it will be seen that the segmental group A of strands is indicated as having six of the binder strands 3, which pass through the heddles 6, located at the right hand side of the warp strand supports 5, the switches 7 being in the position shown in Fig. 3 or Fig. 13, the heddles 6 being required to move downward before passing strands 3 toward the left around the ends of the warp supports 5. The segmental group B of strands in Fig. 9 includes the set of binder strands 3 which pass through the heddles 6' and which are in contact with the left hand side of the warp supports 5 and requires the heddles to move downward before passing the corresponding strands 3 around the end of the warp supports 5 by a motion toward the right through the guidance of the switches in the position shown in Fig. 12.

The parts thus far described are only those which are necessary to be understood in connection with the new features of the machine which produce the particular kind of weave described. It will be understood that other parts may be supplied by those skilled in the art, such as, for instance, a suitable let-off for the yarn and a suitable take-up for the woven fabric. It will also be understood that the yarn for the warp and binder strands is carried on spools or bobbins supported in suitable frames or racks at some point adjacent the machine from which the yarn extends without interfering with free access to the parts of the machine during its operation.

The operation of the machine may be described briefly as follows, the description covering one complete cycle of operation of a segment or section of heddles and switches or during the period the two shuttles make two complete revolutions, thereby laying in four picks or strands of the filler or weft. Starting with the parts in the position indicated in Fig. 6, both of the heddles 6 and 6' are raised and the shuttles are passing between the warp strands 2 and the binder strands 3 so that a strand is being laid in at each diametrically opposite point in the circumference of the forming head 10. When the shuttles have rotated to an angle somewhat less than 90 degrees, the heddles 6' on the left hand side of the machine (Fig. 7) have been lowered previous to the next passage of the following shuttle. This is indicated in the segmental group of strands in section B of Fig. 9 and also in Fig. 12. The switches being inclined toward the left, the moving binder strands are deflected toward the right around the ends of the warp supports 5 and on the upward movement of the heddles 6' are placed at the right hand side of the said supports. Upon a completion of an upward movement of the heddles 6' the next succeeding shuttle passes between the warp strands and the binder strands and is immediately followed by the second shuttle without any change in the heddles 6', thereby causing the particular strands passing through the heddles 6' to be looped over two of the filler strands, but between the passage of the first shuttle and the second shuttle, the other set of binder strands carried by the heddles 6 have been looped under the warp strands, thereby alternating the loops of that set with the loops of the first set so that the said loops are between the two filler strands over which the binder strands in the first set are looped. In the meantime, however, the switches 7 have been changed since loops of both sets of the binder strands have been made in the same direction, as indicated in Fig. 3. Immediately after the passage of both shuttles, constituting one complete revolution of the same, the switches are changed to the position shown in Fig. 13, and before the first shuttle reaches the same set of strands on the second round, the heddles 6' are again lowered and transferred to the opposite side of the warp supports 5 by reason of the inclination of the switches, as shown in Fig. 5. One shuttle then passes between the warp strands and the binder strands after which the second set of heddles is lowered to transfer the corresponding binder strands to the opposite side of the corresponding warp supports without changing the switches. The second shuttle then passes and the parts return to the position indicated in Fig. 6. The actions at all segments of the machine are, of course, duplicates of each other. These actions result in the weaving of the fabric illustrated in Figs. 1, 2 and 3. However, this weaving may be varied according to requirements by rearranging the action of the different parts, as will be apparent to one skilled in the art. For instance, a single shuttle may be used instead of two shuttles, in which case the two sets of heddles would remain in position during two complete revolutions of the shuttle and the switches would be changed only between two complete revolutions of the shuttle, although each set of heddles would have to be lowered and raised alternately. This would produce the same weave but, of course, at only one-half the rate possible with two shuttles unless the speed of the machine be increased so that the single shuttle made twice the number of revolutions per minute. Other changes may be made by those skilled in the art in order to produce different styles of weaving, retaining, however, the essential feature of my improvement which consists in looping the binder strands about stationary warp strands between one or more passages of the shuttles.

Having thus described this form of my invention, I do not wish to be understood as being limited to the details of form and arrangement of parts herein set forth, for various changes may be made in such details without changing the essential features of the machine, as I consider myself entitled to cover any form of machine for securing straight warp strands and spirally wound weft strands together by means of a binder strand without interweaving said warp strands and weft strands.

What I claim and desire to protect by Letters Patent is:

1. In a circular loom for weaving tubular fabric, a rotary shuttle for wrapping weft strands helically about substantially straight warp strands, and means for weaving binder strands alternately over successive warp strands and weft strands without interweaving the latter.

2. In a circular loom for weaving tubular fabric, a rotary shuttle for wrapping weft strands continuously and helically about substantially straight warp strands and means for weaving binder strands over successive warp strands and weft strands, the latter being under greater tension than said binder strands.

3. In a circular loom for weaving tubular fabric, a rotary shuttle for wrapping weft strands continuously and helically about substantially straight warp strands maintained under constant tension, and means for weaving binder strands over successive warp strands and pairs of weft strands, the binder strands being under less tension than said warp strands.

4. In a circular loom for weaving tubular fabric, a rotary shuttle for wrapping weft strands continuously and helically about substantially straight warp strands, and means for weaving binder strands over the warp strands and successive pairs of weft strands, the pairs being composed of alternately adjacent weft strands.

5. In a circular loom for weaving tubular fabric, a rotary weft shuttle, means for forming sheds between warp strands and binder strands, and means for weaving the binder strands over the warp strands between successive sheds.

6. In a circular loom for weaving tubular fabric, a rotary weft shuttle, means for forming sheds between fixed warp strands and movable binder strands, which strands are located respectively on opposite sides of the path of the shuttle during the passage of the same, and means for weaving the binder strands over the fixed strands between successive sheds.

7. In a circular loom for weaving tubular fabric, a rotary weft shuttle, means for maintaining warp strands stationary on one side of the path of rotation of said shuttle, and means for weaving binder strands about said warp strands between successive picks of the weft.

8. In a circular loom for weaving tubular fabric, a rotary weft shuttle, means for maintaining warp strands stationary on one side of the path of rotation of said shuttle, means for holding binder strands on the other side of the path of said shuttle during the passage of the latter, and means for weaving the binder strands about said warp strands between the picks of the weft.

9. In a circular loom for weaving tubular fabric, means for maintaining stationary warp strands under tension, a rotary weft shuttle, and means for weaving binder strands under less tension about said warp strands between the picks of the weft.

10. In a circular loom for weaving tubular fabric, means for maintaining stationary warp strands under tension, a weft shuttle adapted to rotate continuously about said warp strands, and means for weaving binder strands about said warp strands between the picks of the weft.

11. In a circular loom for weaving tubular fabric, means for maintaining stationary warp strands under tension, a weft shuttle adapted to rotate continuously about said warp strands, and means for weaving binder strands alternately about said warp strands between the picks of the weft.

12. In a circular loom for weaving tubular fabric, means for maintaining stationary warp strands under tension, a weft shuttle adapted to rotate continuously about said warp strands, and means for carrying a binder strand beneath each warp strand from one side to the other of the latter between successive passages of the shuttle.

13. In a circular loom for weaving tubular fabric, supports over which warp strands pass, heddles for binder strands adjacent said supports, means for guiding the binder strands about said supports, and a rotary shuttle adapted to pass between said binder and warp strands when the same are separated.

14. In a circular loom for weaving tubular fabric, supports over which the warp strands pass, heddles for binder strands adjacent said supports, means separate from said heddles for causing said binder strands to pass around the ends of said supports, and a rotary shuttle adapted to pass between said binder and warp strands when the same are separated.

15. In a circular loom for weaving tubular fabric, supports over which the warp strands pass, heddles for binder strands adjacent said supports, and yarn deflecting switches located adjacent the ends of said supports.

16. In a circular loom for weaving tubular fabric, supports over which the warp strands pass, heddles for binder strands adjacent said supports, pivoted yarn deflecting switches located adjacent the ends of said supports, and means for automatically oscillating said switches at predetermined intervals.

17. In a circular loom for weaving tubular fabric, a rotary weft shuttle, supports over which warp strands pass, heddles for binder strands adjacent said supports, pivoted deflecting switches located between said heddles and said supports, and means for oscillating said switches in accordance with a predetermined number of rotations of said shuttle.

18. In a circular loom for weaving tubular fabric, a rotary shuttle, driving mechanism therefor, supports over which the warp strands pass, heddles for binder strands adjacent said supports, pivoted deflecting switches located between said heddles and said supports, and means connected with said shuttle driving mechanism for oscillating said switches in accordance with the rotations of the said driving mechanism.

19. In a circular loom for weaving tubular fabric, a rotary shuttle, driving mechanism therefor, supports over which the warp strands pass, heddles for binder strands adjacent said supports, pivoted deflecting switches located between said heddles and said supports, a cam carried by said driving mechanism and connections between said cam and said switches for oscillating the latter.

20. In a loom, a weaving device comprising a projecting support, the end of which carries a strand of yarn, means for reciprocating a second strand of yarn along the sides of said supports, and means separate from said reciprocating means for causing the latter strand to be transferred from one side to the other of said support about its end.

21. In a loom, a looping device, comprising a fixed projecting rod, the end of which carries a strand of yarn, means for reciprocating a second strand of yarn along the sides of said rod, and a deflecting switch for causing the latter strand to be transferred alternately from one side to the other of said rod about its end.

22. In a loom, a looping device comprising a projecting rod, the end of which carries a strand of yarn, means for reciprocating a second strand of yarn along the sides of said rod, a pointed deflecting switch located adjacent the end of said rod, and means for moving said switch to opposite sides of said rod between reciprocations of said second strand of yarn.

23. In a circular loom for weaving tubular fabric, a looping device comprising a projecting rod, the end of which carries a strand of yarn, means for reciprocating a second strand of yarn along the sides of said rod, an oscillating pointed switch located adjacent the end of said rod, and means for oscillating the point of said switch to opposite sides of said rod between reciprocations of said second strand of yarn.

24. In a loom, a switch device for yarn, comprising a fixed yarn support or needle, means for reciprocating a strand of yarn under tension along the sides thereof, and an inclined guide slightly overlapping the end of said support or needle and adapted to deflect said strand under tension around the end or point thereof.

25. In a loom, a switch device for yarn, comprising a fixed yarn support or needle, means for reciprocating strands of yarn under tension along the sides thereof, and movable inclined guides slightly overlapping the end of said support or needle and adapted to deflect said strands under tension around the end or point of said needle from one side to the other thereof.

26. In a loom, a weaving device, comprising a series of projecting supports over the ends of which strands of yarn pass, a plurality of groups of heddle bars adjacent alternate yarn supports, means for reciprocating said groups of heddle bars independently, and switches located adjacent the ends of said supports.

27. In a loom, a weaving device, comprising a series of projecting rods over the end of each of which a strand of yarn passes, a plurality of groups of heddle bars adjacent alternate yarn supports, means for alternately reciprocating said groups of heddle bars, and switches located adjacent the ends of said supports.

28. In a loom, a weaving device, comprising a series of projecting rods over the end of each of which a strand of yarn passes, a plurality of groups of heddle bars adjacent alternate yarn supports, means for alternately reciprocating said groups of heddle bars, movable switches located between said heddle bars and said supports, and means for moving said switches to transfer the strands from said heddle bars alternately from one side of said supports to the other when said heddle bars are reciprocated.

29. In a circular loom, a rotary weft shuttle, a series of projecting rods, the end of each of which carries a strand of yarn, a plurality of groups of heddle bars adjacent alternate yarn supports, means for alternately reciprocating said groups of heddle bars between successive passages of the shuttle, movable switches located between said heddle bars and said supports, and means for moving said switches between the reciprocations of said heddle bars to transfer the strands from said heddle bars alternately from one side of said supports to the other when said heddle bars are reciprocated.

30. In a circular loom, a rotary weft shuttle, shuttle driving mechanism, a series of projecting rods over the end of each of which a strand of yarn passes, a plurality of groups of heddle bars adjacent alternate yarn supports, means for alternately reciprocating said groups of heddle bars between successive passages of the shuttle, movable switches located between said heddle bars and said supports, and connections between said shuttle driving mechanism and said switches for moving the latter so as to transfer the strands from said heddle bars alternately from one side of said supports to the other when said heddle bars are reciprocated.

31. In a circular loom, a rotary weft shuttle, shuttle driving mechanism, a cam carried thereby, a series of projecting rods over the end of each of which a strand of yarn passes, a plurality of groups of heddle bars adjacent alternate yarn supports, means for alternately reciprocating said groups of heddle bars between successive passages of the shuttle, movable switches located between said heddle bars and said supports, a cam follower on said cam, and connections between said cam follower and said switches for moving the latter so as to transfer the strands from said heddle bars alternately from one side of said supports to the other when said heddle bars are reciprocated.

32. In a circular loom, a plurality of rotary weft shuttles, fixed warp supports for holding the warp strands on one side of the plane of rotation of said shuttles, heddles for normally holding binder strands on the opposite side of said plane, and means for moving a plurality of said heddles into and out of the plane of said warp supports between successive passages of the shuttles.

33. In a circular loom, a plurality of rotary weft shuttles, fixed warp supports for holding the warp strands on one side of the plane of rotation of said shuttles, heddles for normally holding the binder strands on the opposite side of said plane, switches located adjacent the ends of said warp supports, and means for reciprocating a plurality of said heddles past said switches between successive passages of the shuttles.

34. In a circular loom, a plurality of rotary weft shuttles, fixed warp supports for holding the warp strands on one side of the plane of rotation of said shuttles, heddles for normally holding the binder strands on the opposite side of said plane, means for causing said heddles to loop said binder strands about said warp strands between successive passages of the shuttles.

35. In a circular loom, a plurality of rotary weft shuttles, fixed warp supports for holding the warp strands on one side of the plane of rotation of said shuttles, heddles for normally holding the binder strands on the opposite side of said plane, and means for causing said heddles to loop said binder strands about said warp strands after successive passages of a plurality of shuttles.

36. In a circular loom, two rotary weft shuttles, fixed warp supports for holding the warp strands on one side of the plane of rotation of said shuttles, heddles for normally holding the binder strands on the opposite side of said plane, and means for causing said heddles to loop said binder strands about said warp strands after the passage of both of said shuttles successively.

37. In a circular loom, a plurality of weft shuttles, fixed warp supports for holding the warp strands on one side of the plane of rotation of said shuttles, a plurality of groups of heddles for normally holding the binder strands on the opposite side of said plane, and means for causing said groups of heddles alternately to loop corresponding binder strands about said warp strands after the passages of a plurality of shuttles successively.

38. In a circular loom, two rotary weft shuttles, fixed warp supports for holding the warp strands on one side of the plane of rotation of said shuttles, a plurality of groups of alternate heddles for normally holding the binder strands on the opposite side of said plane, and means for causing said groups of heddles alternately to loop corresponding binder strands about said warp strands after the passage of both shuttles successively.

39. In a circular loom, a plurality of rotary weft shuttles, fixed warp supports for holding the warp strands on one side of the plane of rotation of said shuttles, a plurality of groups of heddles for normally holding the binder strands on the opposite side of said plane, means for reciprocating said groups of heddles alternately after the passage of a corresponding shuttle, and switches located adjacent the ends of said warp supports for transferring said binder strands from one side of said supports to the other.

40. In a circular loom, two rotary weft shuttles, fixed warp supports for holding the warp strands on one side of the plane of rotation of said shuttles, two groups of heddles for normally holding the binder strands on the opposite side of said plane, means for reciprocating each group of heddles alternately after the passage of two shuttles, and switches located adjacent the ends of said warp support for transferring said binder strands from one side of said supports to the other.

41. In a circular loom, two rotary weft shuttles, fixed warp supports for holding the warp strands on one side of the plane of rotation of said shuttles, two groups of heddles for normally holding the binder strands on the opposite side of said plane, means for reciprocating each group of heddles alternately after the passage of the shuttles, switches located adjacent the ends of said warp supports for transferring said binder strands from one side of said supports to the other, and connections controlled by the rotation of said shuttles for operating said switches.

42. In a circular loom, two rotary weft shuttles, shuttle driving mechanism, fixed warp supports for holding the warp strands on one side of the plane of rotation of said shuttles, two groups of heddles for normally holding the binder strands on the opposite side of said plane, means for reciprocating each group of heddles alternately after the passage of the shuttles, switches located adjacent the ends of said warp supports for transferring said binder strands from one side to the other of said supports, a cam carried by said shuttle driving mechanism and operatively connected with said switches for oscillating the same between each complete revolution of said shuttles.

43. In a circular loom, two rotary weft shuttles, means for looping binder strands over the warp strands comprising a plurality of switches, a rotary cam having a double cam track and cross-overs from one section of the track to the other at one point in its circumference, a follower adapted to engage alternately each section of said track, and connections between said follower and said switches.

44. In a circular loom, two rotary weft shuttles, shuttle driving mechanism, means for looping binder strands over the warp strands, comprising a plurality of switches, a rotary cam having a double cam track and cross-overs from each section of the track to the other at one point in its circumference, said cam being carried by said shuttle driving mechanism, a follower adapted to engage each section of said track, and connections between said follower and said shuttles.

Signed at Sandy Hook, Ct., this 28th day of January, 1914.

MATTHEW R. RHOMOSER.

Witnesses:
A. T. COLE,
C. A. PEALE.